(12) United States Patent
Gonion

(10) Patent No.: US 9,116,686 B2
(45) Date of Patent: Aug. 25, 2015

(54) SELECTIVE SUPPRESSION OF BRANCH PREDICTION IN VECTOR PARTITIONING LOOPS UNTIL DEPENDENCY VECTOR IS AVAILABLE FOR PREDICATE GENERATING INSTRUCTION

(75) Inventor: Jeffry E. Gonion, Campbell, CA (US)

(73) Assignee: Apple Inc., Cupertino, CA (US)

( * ) Notice: Subject to any disclaimer, the term of this patent is extended or adjusted under 35 U.S.C. 154(b) by 755 days.

(21) Appl. No.: 13/437,482

(22) Filed: Apr. 2, 2012

(65) Prior Publication Data

US 2013/0262833 A1    Oct. 3, 2013

(51) Int. Cl.
*G06F 9/38*         (2006.01)
*G06F 9/30*         (2006.01)

(52) U.S. Cl.
CPC ........ *G06F 9/30072* (2013.01); *G06F 9/30036* (2013.01); *G06F 9/30058* (2013.01); *G06F 9/3842* (2013.01); *G06F 9/3848* (2013.01)

(58) Field of Classification Search
CPC ... G06F 9/3885; G06F 9/30072; G06F 9/325; G06F 9/3804; G06F 9/3838; G06F 9/3842–9/3844; G06F 9/30058; G06F 9/30094; G06F 9/30036; G06F 9/3848; G06F 8/445; G06F 8/443
See application file for complete search history.

(56) References Cited

U.S. PATENT DOCUMENTS

| | | | |
|---|---|---|---|
| 5,228,131 A * | 7/1993 | Ueda et al. | 712/240 |
| 5,903,750 A | 5/1999 | Yeh et al. | |
| 6,988,183 B1 | 1/2006 | Wong | |
| 7,571,302 B1 | 8/2009 | Chen | |
| 8,131,979 B2 | 3/2012 | Gonion et al. | |
| 2001/0032308 A1 | 10/2001 | Grochowski et al. | |
| 2006/0168432 A1 | 7/2006 | Caprioli | |
| 2009/0150657 A1 | 6/2009 | Gschwind et al. | |
| 2009/0172360 A1 | 7/2009 | Hikichi | |
| 2010/0042789 A1 | 2/2010 | Gonion et al. | |

(Continued)

FOREIGN PATENT DOCUMENTS

| JP | H11-85515 | 3/1999 |
|---|---|---|
| JP | 2000-322257 | 11/2000 |

(Continued)

OTHER PUBLICATIONS

International Search Report and Written Opinion in application No. PCT/US13/34360 mailed Mar. 28, 2013 pp. 1-9.

(Continued)

*Primary Examiner* — Kenneth Kim
(74) *Attorney, Agent, or Firm* — Anthony M. Petro; Meyertons, Hood, Kivlin, Kowert & Goetzel, P.C.

(57) ABSTRACT

A method for suppressing prediction of a backward branch instruction used in a vector partitioning loop includes detecting the first backward branch instruction that occurs after a predicate generating instruction. The predicate generating instruction generates a predicate vector that is dependent upon a dependency vector where each element of the dependency vector indicates whether a data dependency exists between elements of a vector instruction. The method also includes receiving an indication of a prediction accuracy of a prediction of the backward branch instruction. If the prediction accuracy does not satisfy a threshold value, the prediction of the backward branch instruction is suppressed until the dependency vector on which the predicate-generating instruction depends is available.

21 Claims, 9 Drawing Sheets

(56) References Cited

U.S. PATENT DOCUMENTS

| | | |
|---|---|---|
| 2010/0042807 A1 | 2/2010 | Gonion et al. |
| 2010/0042815 A1 | 2/2010 | Gonion et al. |
| 2010/0042816 A1 | 2/2010 | Gonion et al. |
| 2010/0042817 A1 | 2/2010 | Gonion et al. |
| 2010/0042818 A1 | 2/2010 | Gonion et al. |
| 2010/0049950 A1 | 2/2010 | Gonion et al. |
| 2010/0049951 A1 | 2/2010 | Gonion et al. |
| 2010/0058037 A1 | 3/2010 | Gonion et al. |
| 2010/0115233 A1 | 5/2010 | Brewer et al. |
| 2010/0325398 A1 | 12/2010 | Gonion et al. |
| 2010/0325399 A1 | 12/2010 | Gonion et al. |
| 2010/0325483 A1 | 12/2010 | Gonion et al. |
| 2011/0035567 A1 | 2/2011 | Gonion et al. |
| 2011/0035568 A1 | 2/2011 | Gonion et al. |
| 2011/0093681 A1 | 4/2011 | Gonion et al. |
| 2011/0113217 A1 | 5/2011 | Gonion et al. |
| 2011/0276782 A1 | 11/2011 | Gonion et al. |
| 2011/0283092 A1 | 11/2011 | Gonion |
| 2012/0060020 A1 | 3/2012 | Gonion et al. |
| 2012/0204007 A1 | 8/2012 | Reid |

FOREIGN PATENT DOCUMENTS

| | | |
|---|---|---|
| JP | 2008-529191 | 7/2008 |
| JP | 2010-152843 | 7/2010 |
| JP | 2010-524107 | 7/2010 |
| JP | 2013-175201 | 9/2013 |
| TW | 201030610 | 8/2010 |
| WO | 2008/029450 | 3/2008 |

OTHER PUBLICATIONS

Notice of Preliminary Rejection in Korean Application No. 10-2013-35807 mailed Jun. 30, 2014, 3 pages.
Office Action in Japanese Patent Application No. 2013-87861 mailed Aug. 6, 2014, 13 pages.
Srilatha Manne, et al., "Pipeline Gating: Speculation Control for Energy Reduction," Proceedings of the 25th annual International Symposium on Computer Architecture, IEEE, Jun. 27, 1998, pp. 132-141.
International Preliminary Report in Application No. PCT/US2013/034360 mailed Oct. 16, 2014, 7 pages.
Office Action in Taiwanese Application No. 102111747 mailed May 7, 2015, 14 pages.
Office Action in Japanese Patent Application No. 2013-87861 mailed Jan. 5, 2015, 8 pages.
Hyesoon Kim, et al., "Wish Branches: Combining Conditional Branching and Predication for Adaptive Predicated Execution," International Symposium on Microarchitecture—MICRO, 2005, pp. 43-54.
Notice of Allowance in Korean Application No. 10-2013-35807 mailed Feb. 27, 2015, and allowed claims in English, 5 pages.
Office Action in Chinese Application No. 201310112340.9 dated Feb. 28, 2015, 35 pages.

* cited by examiner

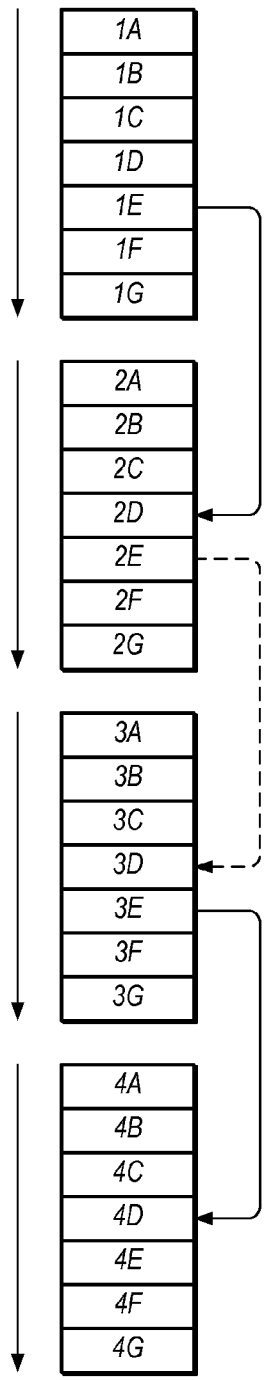
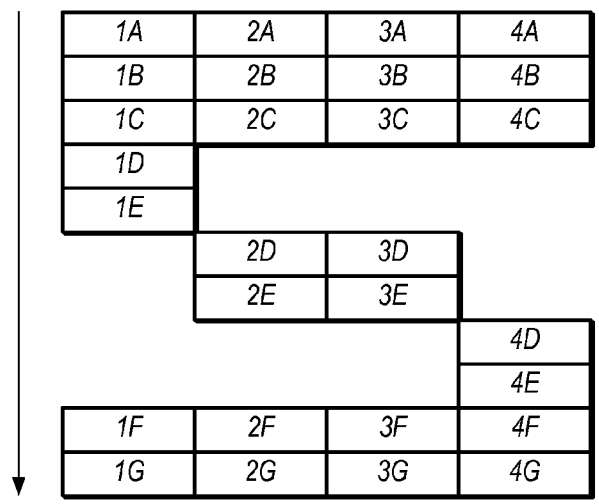
FIG. 3

| x = 0,  | A[x] = 1,  | r = 1,  | s = 0,  | B[x] = 1  |
| x = 1,  | A[x] = 10, | r = 1,  | s = 16, | B[x] = 17 |
| x = 2,  | A[x] = 16, | r = 1,  | s = 16, | B[x] = 17 |
| x = 3,  | A[x] = 16, | r = 1,  | s = 26, | B[x] = 27 |
| x = 4,  | A[x] = 26, | r = 1,  | s = 29, | B[x] = 30 |
| x = 5,  | A[x] = 29, | r = 1,  | s = 9,  | B[x] = 10 |
| x = 7,  | A[x] = 9,  | r = 13, | s = 9,  | B[x] = 22 |
| x = 7,  | A[x] = 1,  | r = 0,  | s = 9,  | B[x] = 9  |
| x = 8,  | A[x] = 20, | r = 0,  | s = 20, | B[x] = 20 |
| x = 9,  | A[x] = 0,  | r = 17, | s = 20, | B[x] = 37 |
| x = 10, | A[x] = 16, | r = 17, | s = 9,  | B[x] = 26 |
| x = 11, | A[x] = 14, | r = 17, | s = 1,  | B[x] = 18 |
| x = 12, | A[x] = 20, | r = 17, | s = 17, | B[x] = 34 |
| x = 13, | A[x] = 14, | r = 17, | s = 19, | B[x] = 36 |
| x = 14, | A[x] = 22, | r = 17, | s = 15, | B[x] = 32 |
| x = 15, | A[x] = 13, | r = 17, | s = 30, | B[x] = 47 |

*FIG. 4A*

| x =          | 0  | 1  | 2  | 3  | 4  | 5  | 6  | 7  |
|---|---|---|---|---|---|---|---|---|
| A[x] =       | 1  | 10 | 16 | 16 | 26 | 29 | 9  | 1  |
| r = A[x+s] = | 1  |    |    |    |    |    |    |    |
| s = A[x+r] = |    | 16 | 16 | 26 | 29 | 9  |    |    |
| r = A[x+s] = |    |    |    |    |    |    | 13 | 0  |
| B[x] =       | 1  | 17 | 17 | 27 | 30 | 10 | 22 | 9  |

| x =          | 8  | 9  | 10 | 11 | 12 | 13 | 14 | 15 |
|---|---|---|---|---|---|---|---|---|
| A[x] =       | 20 | 0  | 16 | 14 | 20 | 14 | 22 | 13 |
| s = A[x+r] = | 20 |    |    |    |    |    |    |    |
| r = A[x+s] = |    | 17 |    |    |    |    |    |    |
| s = A[x+r] = |    |    | 9  | 1  | 17 | 19 | 15 | 30 |
| B[x] =       | 20 | 37 | 26 | 18 | 34 | 36 | 32 | 47 |

*FIG. 4B*

SOURCE CODE

```
r = 0 ;
s = 0 ;
for (x=0; x<KSIZE; ++x)
{
    if (A[x] < FACTOR)
    {
        r = A[x+s] ;
    {
    else
    {
        s = A[x+r] ;
    }
    B[x] = r + s ;
}
```

*FIG. 5A*

VECTORIZED CODE

```
r = 0 ;
s = 0 ;
x = VectorIndex (0,1) ;
goto Loop1Tail ;
Loop1:
    s = PropagatePriorF (s,p0) ;
    ~p0; t = VectorReadInt (A, x) ;
    p1 = (t < FACTOR) ;
    i2 = ConditionalStop (p1, kTF | kFT) ;
    p2 = 0 ;
Loop2:
    !p0; p2 = GeneratePredicates (p2, i2) ;
    ~p2; t = VectorTest (p1) ;
    if ( !FIRST () ) goto Skip1 ;
    t1 = x + s ;
    ~p2; r = VectorReadInt (A, t1) ;
    goto Skip2 ;
Skip1 :
    r = PropagatePriorF (r, p2) ;
    t2 = x + r ;
    ~p2; s = VectorReadInt (A, t2) ;
    s = PropagatePostT (s, s, p2) ;
Skip2 :
    if ( !CARRY () ) goto Loop2 ;
    v = r + s ;
    ~p0; s = VectorWriteInt (B, x, v) ;
    x += VECLEN ;
Loop1Tail:
    p0 = (x < KSIZE) ;
    if ( FIRST (p0) ) goto Loop1 ;
```

*FIG. 5B*

EXAMPLE 2A
VECTORIZED
(NON-SPECULATIVE)

```
            j = 0;
            x = VectorIndex (0,1) ;
            goto Loop1Tail;
        Loop1:
            p3 = 0;
            j = PropagatePriorF (j, p0) ;
            ~p0; t = VectorReadInt (A, x) ;
            p1 = t < FACTOR;
            p2 = ConditionalStop (p1, kTT | kTF) ;
        Loop2:
            t = x + j ;
            !p0; p3 = GeneratePredicates (p3, p2) ;
            ~p3; t = VectorTest (p1) ;
            if ( NONE () ) goto Loop2Tail ;
            !p3; p4 = p1 + 0;
            ~p4; j = VectorRead (A, t) ;
            j = PropagatePostT (j, j, p4) ;
        Loop2Tail:
            if ( !CARRY () ) goto Loop2
            ~p0; VectorWrite (B, x, j) ;
            x += VECLEN;
        Loop1Tail:
            p0 = (x < KSIZE) ;
            if ( FIRST () ) goto Loop1;
```

FIG. 6A

EXAMPLE 2B
VECTORIZED
(SPECULATIVE)

```
            j = 0;
            x = VectorIndex (0,1) ;
            goto Loop1Tail ;
        Loop1:
            p3 = 0 ;
            j = PropagatePriorF (j, p0) ;
        Loop2:
            !p0; p5 = Remaining (p3) ;
            ~p5; t = x + j ;
            ~p5; t = VectorReadIntFF (A, t, ps) ;
            ~p5; p5 &= ps ;
            ~p5; p1 (t < FACTOR) ;
            !p5; i2 = ConditionalStop (p1, kTT | kTF) ;
            !p0; p3 = GeneratePredicates (p3, i2) ;
            ~p3; VectorTest (p1) ;
            ~p3; if (NONE () ) goto Loop2Tail ;
            !p3; p4 = p1 + 0 ;
            ~p4; j = VectorRead (A, x) ;
            j = PropagatePostT (j, j, p4) ;
        Loop2Tail:
            ~p0; VectorTest (p3) ;
            if ( !LAST () ) goto Loop2 ;
            ~p0; VectorWrite (B, x, j) ;
            x += VECLEN ;
        Loop1Tail:
            p0 = (x < KSIZE) ;
            if ( FIRST () ) goto Loop1 ;
```

FIG. 6B

EXAMPLE 3
VECTORIZED

```
        x = VectorIndex (0,1) ;
        goto Loop1Tail ;
Loop1:
        ~p0; r = VectorReadInt(C,x);
        ~p0; s = VectorReadInt (D, x) ;
        i1 = CheckHazardP(r,x,p0);
        i2 = CheckHazardP(s,x,p0);
        i3 = VectorMax(i1,i2);
        p4 = 0 ;
Loop2:
        ~p0; p4 = GeneratePredicates (p4, i3) ;
        ~p4; t1 = VectorReadInt(A,r) ;
        ~p4; t2 = VectorReadInt(A,s);
        ~p4; t3 = t1 + t2 ;
        ~p4; VectorWriteInt(A,x,t3);
        ~p0; if (!CARRY( )) goto Loop2;
        x += VECLEN;
Loop1Tail:
        p0 = (x < KSIZE) ;
        if ( FIRST (p0) ) goto Loop1 ;
```

FIG. 7

EXAMPLE 4
VECTORIZED

```
        x = VectorIndex (0,1) ;
        goto Loop1Tail ;
Loop1:
    j = PropagatePriorF(j,p0);
    ~p0; f = VectorReadInt(A,x);
    ~p0; g = VectorReadInt (B, x) ;
    !p0; p1 = (f < FACTOR);
    !p0; p2 = (g < FACTOR);
    ~p1; h = VectorReadInt(C,x);
    ~p2; i = VectorReadInt(D,x);
    !p1; ix = CheckHazardP(h,i,p2);
    p3 = 0 ;
Loop2:
    p3 = GeneratePredicates (p3, ix) ;
    !p3; p4 = p1 + 0;
    !p3; p5 = p2 + 0;
    ~p4; j = VectorReadInt(E,h);
    j = CopyPropagate(j,j,p4);
    ~p5; VectorWriteInt(E,i,j);
    ~p0; if (!LAST(p3)) goto Loop2;
    x += VECLEN;
Loop1Tail:
    p0 = (x < KSIZE) ;
    if ( FIRST (p0) ) goto Loop1 ;
```

FIG. 8

SELECTIVE SUPPRESSION OF BRANCH PREDICTION IN VECTOR PARTITIONING LOOPS UNTIL DEPENDENCY VECTOR IS AVAILABLE FOR PREDICATE GENERATING INSTRUCTION

BACKGROUND

1. Technical Field

This disclosure relates to processors, and more particularly to prediction of certain branch instructions during execution of vector partitioning loops.

2. Description of the Related Art

Branch prediction has become commonplace in most modern processors. While backward branches may be highly predictable in many cases, some backward branches may be predicted poorly by conventional branch predictors. More particularly, Macroscalar processors and compilers rely on vector partitioning loops to correctly handle possible loop carried dependencies such as memory hazards, for example. Vector partitioning loops use backward branches to iterate on the loop. In cases where the vector is partitioned frequently, the conventional branch predictor may perform poorly, which may adversely affect processor performance.

SUMMARY OF THE EMBODIMENTS

Various embodiments of a method for suppressing prediction of a backward branch instruction used in a vector-partitioning loop are disclosed. Broadly speaking, a method is contemplated in which the first backward branch instruction that occurs after a predicate generating instruction is detected. The predicate generating instruction generates a predicate vector that is dependent upon a dependency vector where each element of the dependency vector indicates whether a data dependency exists between elements of a vector instruction. If a received indication of a prediction accuracy of a prediction of the backward branch instruction does not satisfy a threshold value, the prediction of the backward branch instruction may be suppressed until the dependency vector on which the predicate-generating instruction depends is available.

In one embodiment, the method includes detecting a first conditional branch instruction that follows a predicate-generating instruction. The predicate-generating instruction, when executed, generates a predicate vector dependent upon a dependency vector. Each element of the dependency vector includes an index that indicates whether a data dependency exists between elements of a vector instruction. In addition, the method may include receiving an indication of a prediction accuracy of the first conditional branch instruction. In response to determining that the prediction accuracy of the first conditional branch instruction does not satisfy a threshold value, prediction of the first conditional branch instruction may be suppressed until the dependency vector on which the predicate-generating instruction depends is available.

In one specific implementation, the method may also include predicting the first conditional branch instruction responsive to detecting that the dependency vector is available, using data dependency information indicated in the dependency vector.

BRIEF DESCRIPTION OF THE DRAWINGS

FIG. 3 is a diagram illustrating an example parallelization of a program code loop.

FIG. 4A is a diagram illustrating a sequence of variable states during scalar execution of the loop shown in Example 1.

FIG. 4B is a diagram illustrating a progression of execution for Macroscalar vectorized program code of the loop of Example 1.

FIG. 5A and FIG. 5B are diagrams illustrating one embodiment of the vectorization of program source code.

FIG. 6A is a diagram illustrating one embodiment of non-speculative vectorized program code.

FIG. 6B is a diagram illustrating another embodiment of speculative vectorized program code.

FIG. 7 is a diagram illustrating one embodiment of vectorized program code.

FIG. 8 is a diagram illustrating another embodiment of vectorized program code.

Figure 1:
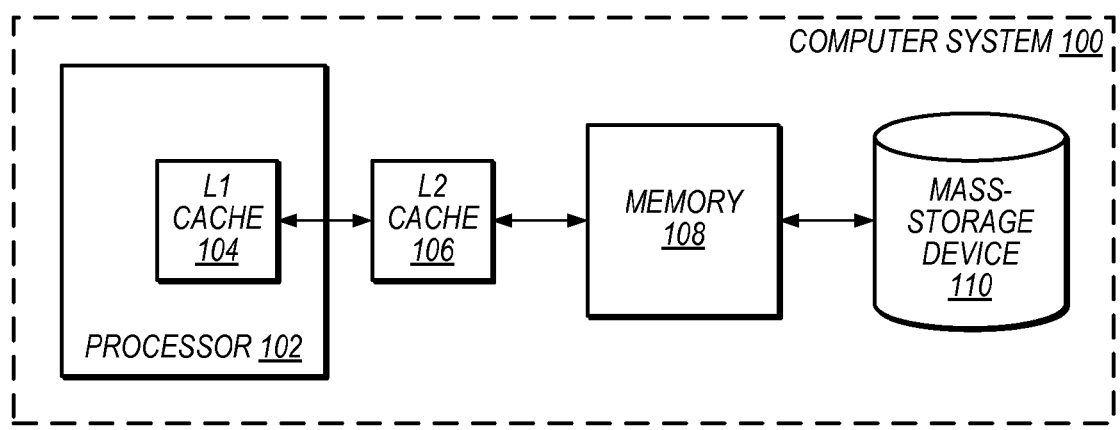
FIG. 1 is a block diagram of one embodiment of a computer system.

Specific embodiments are shown by way of example in the drawings and will herein be described in detail. It should be understood, however, that the drawings and detailed description are not intended to limit the claims to the particular embodiments disclosed, even where only a single embodiment is described with respect to a particular feature. On the contrary, the intention is to cover all modifications, equivalents and alternatives that would be apparent to a person skilled in the art having the benefit of this disclosure. Examples of features provided in the disclosure are intended to be illustrative rather than restrictive unless stated otherwise.

As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six, interpretation for that unit/circuit/component.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Computer System Overview

Turning now to FIG. 1, a block diagram of one embodiment of a computer system is shown. Computer system 100 includes a processor 102, a level two (L2) cache 106, a memory 108, and a mass-storage device 110. As shown, processor 102 includes a level one (L1) cache 104. It is noted that although specific components are shown and described in computer system 100, in alternative embodiments different components and numbers of components may be present in computer system 100. For example, computer system 100 may not include some of the memory hierarchy (e.g., memory 108 and/or mass-storage device 110). Alternatively, although the L2 cache 106 is shown external to the processor 102, it is contemplated that in other embodiments, the L2 cache 106 may be internal to the processor 102. It is further noted that in such embodiments, a level three (L3) cache (not shown) may be used. In addition, computer system 100 may include graphics processors, video cards, video-capture devices, user-interface devices, network cards, optical drives, and/or other peripheral devices that are coupled to processor 102 using a bus, a network, or another suitable communication channel (all not shown for simplicity).

In various embodiments, processor 102 may be representative of a general-purpose processor that performs computational operations. For example, processor 102 may be a central processing unit (CPU) such as a microprocessor, a microcontroller, an application-specific integrated circuit (ASIC), or a field-programmable gate array (FPGA). However, as described further below, processor 102 may include one or more mechanisms for vector processing (e.g., vector execution units). An example vector execution unit of processor 102 is described in greater detail below in conjunction with the description of FIG. 2.

The mass-storage device 110, memory 108, L2 cache 10, and L1 cache 104 are storage devices that collectively form a memory hierarchy that stores data and instructions for processor 102. More particularly, the mass-storage device 110 may be a high-capacity, non-volatile memory, such as a disk drive or a large flash memory unit with a long access time, while L1 cache 104, L2 cache 106, and memory 108 may be smaller, with shorter access times. These faster semiconductor memories store copies of frequently used data. Memory 108 may be representative of a memory device in the dynamic random access memory (DRAM) family of memory devices. The size of memory 108 is typically larger than L1 cache 104 and L2 cache 106, whereas L1 cache 104 and L2 cache 106 are typically implemented using smaller devices in the static random access memories (SRAM) family of devices. In some embodiments, L2 cache 106, memory 108, and mass-storage device 110 are shared between one or more processors in computer system 100.

In some embodiments, the devices in the memory hierarchy (i.e., L1 cache 104, etc.) can access (i.e., read and/or write) multiple cache lines per cycle. These embodiments may enable more effective processing of memory accesses that occur based on a vector of pointers or array indices to non-contiguous memory addresses.

It is noted the data structures and program instructions (i.e., code) described below may be stored on a non-transitory computer-readable storage device, which may be any device or storage medium that can store code and/or data for use by a computer system (e.g., computer system 100). Generally speaking, a non-transitory computer-readable storage device includes, but is not limited to, volatile memory, non-volatile memory, magnetic and optical storage devices such as disk drives, magnetic tape, compact discs (CDs), digital versatile discs or digital video discs (DVDs), or other media capable of storing computer-readable media now known or later developed. As such, mass-storage device 110, memory 108, L2 cache 10, and L1 cache 104 are all examples of non-transitory computer readable storage devices.

Processor

Figure 2:
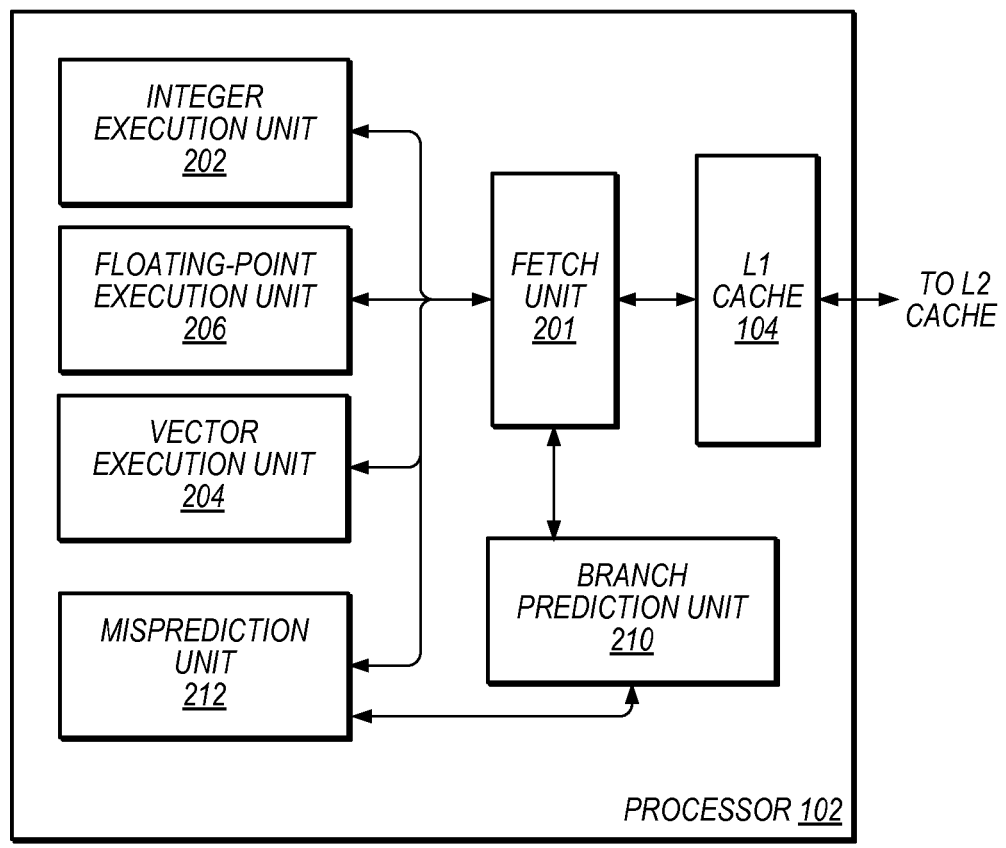
FIG. 2 is a block diagram illustrating additional details an embodiment of the processor shown in FIG. 1.

Referring to FIG. 2, a block diagram illustrating additional details of an embodiment of the processor of FIG. 1 is shown. In the embodiment shown in FIG. 2, processor 102 may include a number of pipeline stages, although for brevity not all are shown in FIG. 2. Accordingly, as shown, processor 102 includes L1 cache 104, an instruction fetch unit 201, a branch prediction unit 210, a misprediction unit 212, an integer execution unit 202, a floating-point execution unit 206, and a vector execution unit 204. It is noted that integer execution unit 202, floating-point execution unit 206, and vector execution unit 204 as a group may be interchangeably referred to as "the execution units."

In various embodiments, the execution units may perform computational operations such as logical operations, mathematical operations, or bitwise operations, for example, for an associated type of operand. More specifically, integer execution unit 202 may perform computational operations that involve integer operands, floating-point execution unit 206 may perform computational operations that involve floating-point operands, and vector execution unit 204 may perform computational operations that involve vector operands. Integer execution units and floating-point execution units are generally known in the art and are not described further for brevity. As noted above, although the embodiment of processor 102 shown in FIG. 2 includes a particular set of components, it is contemplated that in alternative embodiments processor 102 may include different numbers or types of execution units, functional units, and pipeline stages such as an instruction decode unit, a scheduler or reservations stations, a reorder buffer, a memory management unit, I/O interfaces, etc. that may be coupled to the execution units.

The vector execution unit 204 may be representative of a single-instruction-multiple-data (SIMD) execution unit in the classical sense, in that it may perform the same operation on multiple data elements in parallel. However, it is noted that in some embodiments, the vector instructions described here may differ from other implementations of SIMD instructions. For example, in an embodiment, elements of a vector operated on by a vector instruction may have a size that does not vary with the number of elements in the vector. By contrast, in some SIMD implementations, data element size does vary with the number of data elements operated on (e.g., a SIMD architecture might support operations on eight 8-bit elements, but only four 16-bit elements, two 32-bit elements, etc.). In one embodiment, the vector execution unit 204 may operate on some or all of the data elements that are included in vectors of operands. More particularly, the vector execution unit 204 may be configured to concurrently operate on different elements of a vector operand of a vector program instruction.

In one embodiment, the vector execution unit 204 may include a vector register file (not shown) which may include vector registers that can hold operand vectors and result vectors for the vector execution unit 204. In some embodiments, there may be 32 vector registers in the vector register file, and each vector register may include 128 bits. However, in alternative embodiments, there may be different numbers of vector registers and/or different numbers of bits per register.

The vector execution unit 204 may be configured to retrieve operands from the vector registers and to execute vector instructions that cause vector execution unit 204 to perform operations in parallel on some or all of the data elements in the operand vector. For example, vector execution unit 204 can perform logical operations, mathematical operations, or bitwise operations on the elements in the vector. Vector execution unit 204 may perform one vector operation per instruction cycle (although as described above, a "cycle" may include more than one clock cycle that may be used to trigger, synchronize, and/or control vector execution unit 204's computational operations).

In one embodiment, vector execution unit 204 may support vectors that hold N data elements (e.g., bytes, words, double-words, etc.), where N may be any positive whole number. In these embodiments, vector execution unit 204 may perform operations on N or fewer of the data elements in an operand vector in parallel. For example, in an embodiment where the vector is 256 bits in length, the data elements being operated on are four-byte elements, and the operation is adding a value to the data elements, these embodiments can add the value to any number of the elements in the vector. It is noted that N may be different for different implementations of processor 102.

The vector execution unit 204 may, in various embodiments, include at least one control signal that enables the dynamic limitation of the data elements in an operand vector on which vector execution unit 204 operates. Specifically, depending on the state of the control signal, vector execution unit 204 may selectively operate on any or all of the data elements in the vector. For example, in an embodiment where the vector is 512 bits in length and the data elements being operated on are four-byte elements, the control signal can be asserted to prevent operations from being performed on some or all of 16 data elements in the operand vector. Note that "dynamically" limiting the data elements in the operand vector upon which operations are performed can involve asserting the control signal separately for each cycle at runtime.

In some embodiments, as described in greater detail below, based on the values contained in a vector of predicates or one or more scalar predicates, vector execution unit 204 applies vector operations to selected vector data elements only. In some embodiments, the remaining data elements in a result vector remain unaffected (which may also be referred to as "predication") or are forced to zero (which may also be referred to as "zeroing" or "zeroing predication"). In some embodiments, the clocks for the data element processing subsystems ("lanes") that are unused due to predication or zeroing in vector execution unit 204 can be power and/or clock-gated, thereby reducing dynamic power consumption in vector execution unit 204.

In various embodiments, the architecture may be vector-length agnostic to allow it to adapt parallelism at runtime. More particularly, when instructions or operations are vector-length agnostic, the operation (i.e., instruction, etc.) may be executed using vectors of any length, up to the limitations imposed by the supporting hardware. For example, in embodiments in which vector execution hardware supports vectors that can include eight separate four-byte elements (thus having a vector length of eight elements), a vector-length agnostic operation can operate on any number of the eight elements in the vector. On a different hardware implementation that supports a different vector length (e.g., four elements), the vector-length agnostic operation may operate on the different number of elements made available to it by the underlying hardware. Thus, a compiler or programmer need not have explicit knowledge of the vector length supported by the underlying hardware (e.g., vector execution unit 204). In such embodiments, a compiler generates or a programmer writes program code that need not rely on (or use) a specific vector length. In some embodiments it may be forbidden to specify a specific vector size in program code. Thus, the compiled code in these embodiments (i.e., binary code) runs on other execution units that may have differing vector lengths, while potentially realizing performance gains from processors that support longer vectors. In such embodiments, the vector length may for a given hardware unit such as a processor may be read from a system register during runtime. Consequently, as process technology allows longer vectors, execution of legacy binary code simply speeds up without any effort by software developers.

Generally, vector lengths may be implemented as powers of two (e.g., two, four, eight, etc.). However, in some embodiments, vector lengths need not be powers of two. Specifically, vectors of three, seven, or another number of data elements can be used in the same way as vectors with power-of-two numbers of data elements.

In various embodiments, each data element in the vector can contain an address that is used by vector execution unit 204 for performing a set of memory accesses in parallel. In such embodiments, if one or more elements of the vector contain invalid memory addresses, invalid memory-read operations can occur. Accordingly, invalid memory-read operations that would otherwise result in program termination may instead cause any elements with valid addresses to be read and elements with invalid elements to be flagged, allowing program execution to continue in the face of speculative, and in hindsight illegal, read operations.

In some embodiments, processor 102 (and hence vector execution unit 204) is able to operate on and use vectors of pointers. In such embodiments, the number of data elements per vector is the same as the number of pointers per vector, regardless of the size of the data type. Instructions that operate on memory may have variants that indicate the size of the memory access, but elements in processor registers should be the same as the pointer size. In these embodiments, processors that support both 32-bit and 64-bit addressing modes may choose to allow twice as many elements per vector in 32-bit mode, thereby achieving greater throughput. This implies a distinct throughput advantage to 32-bit addressing, assuming the same width data path. Implementation-specific techniques can be used to relax the requirement. For example, double-precision floating-point numbers can be supported in 32-bit mode through register pairing or some other specialized mechanism.

In one embodiment, the branch prediction unit 210 may be configured to generate branch target program counter addresses (PCs) for the fetch unit 201 for conditional branch instructions. More particularly, for conditional branch instructions, the branch prediction unit 210 may predict whether a branch will be taken or not taken and control logic (not shown) may generate the PC for the fetch unit 201 based on the prediction. Instructions may then be fetched, issued, and executed in a speculative manner dependent upon the predicted outcome of the branch. In various embodiments, the branch prediction unit 210 may use any of variety of prediction mechanisms to generate the predictions. For example, branch prediction unit 210 may use local predictors that maintain prediction state (e.g., state machines, tables, counters, or other data structures) for individual branches, global predictors that perform prediction across multiple branches considered in the aggregate, hybrid predictors that combine elements of local and global predictors, or other suitable approaches. In some embodiments, branch prediction unit 210 may employ predictors that dynamically adapt to branch behavior that varies during execution (e.g., to detect and adapt when a branch that was better predicted according to one technique becomes better predicted according to a different technique).

In one embodiment, the misprediction unit 212 is configured to detect when a branch prediction is incorrect (e.g., that the actual behavior of a branch at the time it is executed differs from the predicted behavior of the branch, indicating that the branch was mispredicted). In addition, the misprediction unit 212 may be configured to provide an indication of the misprediction to the execution units 202, 206, and 204, as well as to the branch prediction unit 210. It is noted that although the misprediction unit 212 is shown as a separate unit, it is contemplated that in other embodiments, the misprediction unit 212 may be part of the branch prediction unit 210, or it may be part of the fetch unit 201, or it may be part of any or all of the various execution units (e.g., 202, 204, and 206).

As described above, when a conventional processor mispredicts a branch instruction, the pipeline is flushed of the instructions in the mispredicted path, because these speculatively-issued instructions should not be allowed to modify the state of the processor in view of the incorrect speculation. The fetch unit 201 can then fetch the instructions for the correct, non-speculative path. However, there is a penalty for the flush and fill operation: hundreds of execution cycles may be required before useful work can be resumed.

Accordingly, as described in greater detail below in conjunction with the description of FIG. 7, in one embodiment, the branch prediction unit 210 may maintain prediction accuracy information for the various predictions. The accuracy information for a given branch instruction may be adapted based upon the actual behavior of the branch instruction, once it is executed, in comparison with the way the branch instruction was predicted to behave. To avoid some of the penalty associated with mispredicting backward branches used in vector partitioning loops, when the prediction accuracy is poor, the branch prediction unit 210 may be configured to suppress the prediction and wait for information corresponding to the number of iterations of the loop to become available.

Macroscalar Architecture Overview

An instruction set architecture (referred to as the Macroscalar Architecture) and supporting hardware may allow compilers to generate program code for loops without having to completely determine parallelism at compile-time, and without discarding useful static analysis information. Various embodiments of the Macroscalar Architecture will now be described. Specifically, as described further below, a set of instructions is provided that does not mandate parallelism for loops but, instead, enables parallelism to be exploited at runtime if dynamic conditions permit. Accordingly, the architecture includes instructions that enable code generated by the compiler to dynamically switch between non-parallel (scalar) and parallel (vector) execution for loop iterations depending on conditions at runtime by switching the amount of parallelism used.

Thus, the architecture provides instructions that enable an undetermined amount of vector parallelism for loop iterations but do not require that the parallelism be used at runtime. More specifically, the architecture includes a set of vector-length agnostic instructions whose effective vector length can vary depending on runtime conditions. Thus, if runtime dependencies demand non-parallel execution of the code, then execution occurs with an effective vector length of one element. Likewise, if runtime conditions permit parallel execution, the same code executes in a vector-parallel manner to whatever degree is allowed by runtime dependencies (and the vector length of the underlying hardware). For example, if two out of eight elements of the vector can safely execute in parallel, a processor such as processor 102 may execute the two elements in parallel. In these embodiments, expressing program code in a vector-length agnostic format enables a broad range of vectorization opportunities that are not present in existing systems.

In various embodiments, during compilation, a compiler first analyzes the loop structure of a given loop in program code and performs static dependency analysis. The compiler then generates program code that retains static analysis information and instructs a processor such as processor 102, for example, how to resolve runtime dependencies and to process the program code with the maximum amount of parallelism possible. More specifically, the compiler may provide vector instructions for performing corresponding sets of loop iterations in parallel, and may provide vector-control instructions for dynamically limiting the execution of the vector instructions to prevent data dependencies between the iterations of the loop from causing an error. This approach defers the determination of parallelism to runtime, where the information on runtime dependencies is available, thereby allowing the software and processor to adapt parallelism to dynamically changing conditions. An example of a program code loop parallelization is shown in FIG. 3.

Referring to the left side of FIG. 3, an execution pattern is shown with four iterations (e.g., iterations 1-4) of a loop that have not been parallelized, where each loop includes instructions A-G. Serial operations are shown with instructions vertically stacked. On the right side of FIG. 3 is a version of the loop that has been parallelized. In this example, each instruction within an iteration depends on at least one instruction before it, so that there is a static dependency chain between the instructions of a given iteration. Hence, the instructions within a given iteration cannot be parallelized (i.e., instructions A-G within a given iteration are always serially executed with respect to the other instructions in the iteration). However, in alternative embodiments the instructions within a given iteration may be parallelizable.

As shown by the arrows between the iterations of the loop in FIG. 3, there is a possibility of a runtime data dependency between instruction E in a given iteration and instruction D of the subsequent iteration. However, during compilation, the compiler can only determine that there exists the possibility of data dependency between these instructions, but the compiler cannot tell in which iterations dependencies will actually materialize because this information is only available at runtime. In this example, a data dependency that actually materializes at runtime is shown by the solid arrows from 1E to 2D, and 3E to 4D, while a data dependency that doesn't materialize at runtime is shown using the dashed arrow from 2E to 3D. Thus, as shown, a runtime data dependency actually occurs between the first/second and third/fourth iterations.

Because no data dependency exists between the second and third iterations, the second and third iterations can safely be processed in parallel. Furthermore, instructions A-C and F-G of a given iteration have dependencies only within an iteration and, therefore, instruction A of a given iteration is able to execute in parallel with instruction A of all other iterations, instruction B can also execute in parallel with instruction B of all other iterations, and so forth. However, because instruction D in the second iteration depends on instruction E in the first iteration, instructions D and E in the first iteration must be executed before instruction D for the second iteration can be executed.

Accordingly, in the parallelized loop on the right side, the iterations of such a loop are executed to accommodate both the static and runtime data dependencies, while achieving maximum parallelism. More particularly, instructions A-C and F-G of all four iterations are executed in parallel. But, because instruction D in the second iteration depends on instruction E in the first iteration, instructions D and E in the first iteration must be executed before instruction D for the second iteration can be executed. However, because there is no data dependency between the second and third iterations, instructions D and E for these iterations can be executed in parallel.

Examples of the Macroscalar Architecture

The following examples introduce Macroscalar operations and demonstrate their use in vectorizing loops such as the loop shown in FIG. 3 and described above in the parallelized loop example. For ease of understanding, these examples are presented using pseudocode in the C++ format.

It is noted that the following example embodiments are for discussion purposes. The actual instructions and operations are merely intended to aid an understanding of the architecture. However, in alternative embodiments, instructions or operations may be implemented in a different way, for example, using a microcode sequence of more primitive operations or using a different sequence of sub-operations. Note that further decomposition of instructions is avoided so that information about the macro-operation and the corresponding usage model is not obscured.

Notation

In describing the below examples, the following format is used for variables, which are vector quantities unless otherwise noted:

p5=a<b;

Elements of vector p5 are set to 0 or 1 depending on the result of testing a<b. Note that vector p5 can be a "predicate vector," as described in more detail below. Some instructions that generate predicate vectors also set processor status flags to reflect the resulting predicates. For example, the processor status flags or condition-codes can include the FIRST, LAST, NONE, and/or ALL flags.

p5; a=b+c;

Only elements in vector 'a' designated by active (i.e., non-zero) elements in the predicate vector p5 receive the result of b+c. The remaining elements of a are unchanged. This operation is called "predication," and is denoted using the tilde ("~") sign before the predicate vector.

!p5; a=b+c;

Only elements in vector 'a' designated by active (i.e., non-zero) elements in the predicate vector p5 receive the result of b+c. The remaining elements of a are set to zero. This operation is called "zeroing," and is denoted using the exclamation point ("!") sign before the predicate vector.

```
if (FIRST( )) goto ...; // Also LAST( ), ANY( ), ALL( ), CARRY( ),
ABOVE( ), or NONE( ), (where ANY( ) == !NONE( ))
```

The following instructions test the processor status flags and branch accordingly.

x+=VECLEN;

VECLEN is a machine value that communicates the number of elements per vector. The value is determined at runtime by the processor executing the code, rather than being determined by the assembler.

//Comment

In a similar way to many common programming languages, the following examples use the double forward slash to indicate comments. These comments can provide information regarding the values contained in the indicated vector or explanation of operations being performed in a corresponding example.

In these examples, other C++-formatted operators retain their conventional meanings, but are applied across the vector on an element-by-element basis. Where function calls are employed, they imply a single instruction that places any value returned into a destination register. For simplicity in understanding, all vectors are vectors of integers, but alternative embodiments support other data formats.

Structural Loop-Carried Dependencies

In the code Example 1 below, a program code loop that is "non-vectorizable" using conventional vector architectures is shown. (Note that in addition to being non-vectorizable, this loop is also not multi-threadable on conventional multi-threading architectures due to the fine-grain nature of the data dependencies.) For clarity, this loop has been distilled to the fundamental loop-carried dependencies that make the loop unvectorizable.

In this example, the variables r and s have loop-carried dependencies that prevent vectorization using conventional architectures. Notice, however, that the loop is vectorizable as long as the condition (A[x]<FACTOR) is known to be always true or always false. These assumptions change when the condition is allowed to vary during execution (the common case). For simplicity in this example, we presume that no aliasing exists between A[ ] and B[ ].

EXAMPLE 1

Program Code Loop

```
r = 0;
s = 0;
for (x=0; x<KSIZE; ++x)
{
    if (A[x] < FACTOR)
    {
        r = A[x+s];
    }
    else
    {
        s = A[x+r];
    }
    B[x] = r + s;
}
```

Using the Macroscalar architecture, the loop in Example 1 can be vectorized by partitioning the vector into segments for which the conditional (A[x]<FACTOR) does not change. Examples of processes for partitioning such vectors, as well as examples of instructions that enable the partitioning, are presented below. It is noted that for this example the described partitioning need only be applied to instructions within the conditional clause. The first read of A[x] and the final operation B[x]=r+s can always be executed in parallel across a full vector, except potentially on the final loop iteration.

Instructions and examples of vectorized code are shown and described to explain the operation of a vector processor such as processor 102 of FIG. 2, in conjunction with the Macroscalar architecture. The following description is generally organized so that a number of instructions are described and then one or more vectorized code samples that use the instructions are presented. In some cases, a particular type of vectorization issue is explored in a given example.

dest=VectorReadInt(Base, Offset)

VectorReadInt is an instruction for performing a memory read operation. A vector of offsets, Offset, scaled by the data size (integer in this case) is added to a scalar base address, Base, to form a vector of memory addresses which are then read into a destination vector. If the instruction is predicated or zeroed, only addresses corresponding to active elements are read. In the described embodiments, reads to invalid addresses are allowed to fault, but such faults only result in program termination if the first active address is invalid.

VectorWriteInt(Base, Offset, Value)

VectorWriteInt is an instruction for performing a memory write operation. A vector of offsets, Offset, scaled by the data size (integer in this case) is added to a scalar base address, Base, to form a vector of memory addresses. A vector of values, Value, is written to these memory addresses. If this instruction is predicated or zeroed, data is written only to active addresses. In the described embodiments, writes to illegal addresses always generate faults.

dest=VectorIndex(Start, Increment)

VectorIndex is an instruction for generating vectors of values that monotonically adjust by the increment from a scalar starting value specified by Start. This instruction can be used for initializing loop index variables when the index adjustment is constant. When predication or zeroing is applied, the first active element receives the starting value, and the increment is only applied to subsequent active elements. For example:

$x$=VectorIndex(0,1); //$x$={0 1 2 3 4 5 6 7} dest=PropagatePostT(dest, src, pred)

The PropagatePostT instruction propagates the value of active elements in src, as determined by pred, to subsequent inactive elements of dest. Active elements, and any inactive elements that precede the first active element, remain unchanged in dest. The purpose of this instruction is to take a value that is conditionally calculated, and propagate the conditionally calculated value to subsequent loop iterations as occurs in the equivalent scalar code. For example:

```
Entry
       dest  = { 8  9  A  B  C  D  E  F }
:
       src   = { 1  2  3  4  5  6  7  8 }
       pred  = { 0  0  1  1  0  0  1  0 }
Exit:  dest  = { 8  9  A  B  4  4  E  7 }
``` dest=PropagatePriorF(src, pred)

The PropagatePriorF instruction propagates the value of the inactive elements of src, as determined by pred, into subsequent active elements in dest. Inactive elements are copied from src to dest. If the first element of the predicate is active, then the last element of src is propagated to that position. For example:

```
Entry
       src   = { 1 2 3 4 5 6 7 8 }
:
       pred  = { 1 0 1 1 0 0 1 0 }
Exit:  dest  = { 8 2 2 2 5 6 6 8 }
``` dest=ConditionalStop(pred, deps)

The ConditionalStop instruction evaluates a vector of predicates, pred, and identifies transitions between adjacent predicate elements that imply data dependencies as specified by deps. The scalar value deps can be thought of as an array of four bits, each of which designates a possible transition between true/false elements in pred, as processed from left to right. These bits convey the presence of the indicated dependency if set, and guarantee the absence of the dependency if not set. They are:

kTF—Implies a loop-carried dependency from an iteration for which the predicate is true, to the subsequent iteration for which the value of the predicate is false.

kFF—Implies a loop-carried dependency from an iteration for which the predicate is false, to the subsequent iteration for which the value of the predicate is false.

kFT—Implies a loop-carried dependency from an iteration for which the predicate is false, to the subsequent iteration for which the value of the predicate is true.

kTT—Implies a loop-carried dependency from an iteration for which the predicate is true, to the subsequent iteration for which the value of the predicate is true.

The element position corresponding to the iteration that generates the data that is depended upon is stored in the destination vector at the element position corresponding to the iteration that depends on the data. If no data dependency exists, a value of 0 is stored in the destination vector at that element. The resulting dependency index vector, or DIV, contains a vector of element-position indices that represent dependencies. For the reasons described below, the first element of the vector is element number 1 (rather than 0).

As an example, consider the dependencies in the loop of Example 1 above. In this loop, transitions between true and false iterations of the conditional clause represent a loop-carried dependency that requires a break in parallelism. This can be handled using the following instructions:

```
p1 = (t < FACTOR);            // p1 = {0 0 0 0 1 1 0 0}
p2 = ConditionalStop(p1, kTF|kFT); // p2 = {0 0 0 0 4 0 6 0}
```

Because the 4th iteration generates the required data, and the 5th iteration depends on it, a 4 is stored in position 5 of the output vector p2 (which is the DIV). The same applies for the 7th iteration, which depends on data from the 6th iteration. Other elements of the DIV are set to 0 to indicate the absence of dependencies. (Note that in this example the first element of the vector is element number 1.)

dest=GeneratePredicates(Pred, DIV)

GeneratePredicates takes the dependency index vector, DIV, and generates predicates corresponding to the next group of elements that may safely be processed in parallel, given the previous group that was processed, indicated by pred. If no elements of pred are active, predicates are generated for the first group of elements that may safely be processed in parallel. If Pred indicates that the final elements of the vector have been processed, then the instruction generates a result vector of inactive predicates indicating that no elements should be processed and the ZF flag is set. The CF flag is set to indicate that the last element of the results is active. Using the values in the first example, GeneratePredicates operates as follows:

```
Entry Conditions:            // i2 = { 0 0 0 0 4 0 6 0 }
p2 = 0;                      // p2 = { 0 0 0 0 0 0 0 0 }
Loop2:
p2 = GeneratePredicates(p2,i2); // p2'= { 1 1 1 1 0 0 0 0 }
CF = 0, ZF = 0
if(!PLAST( )) goto Loop2     // p2''= { 0 0 0 0 1 1 0 0 }
```

-continued

```
CF = 0, ZF = 0
// p2'''= { 0 0 0 0 0 0 1 1 }
CF = 1, ZF = 0
```

From an initialized predicate p2 of all zeros, GeneratePredicates generates new instances of p2 that partition subsequent vector calculations into three sub-vectors (i.e., p', p", and p'"). This enables the hardware to process the vector in groups that avoid violating the data dependencies of the loop.

In FIG. 4A a diagram illustrating a sequence of variable states during scalar execution of the loop in Example 1 is shown. More particularly, using a randomized 50/50 distribution of the direction of the conditional expression, a progression of the variable states of the loop of Example 1 is shown. In FIG. 4B a diagram illustrating a progression of execution for Macroscalar vectorized program code of the loop of Example 1 is shown. In FIG. 4A and FIG. 4B, the values read from A[ ] are shown using leftward-slanting hash marks, while the values written to B[ ] are shown using rightward-slanting hash marks, and values for "r" or "s" (depending on which is changed in a given iteration) are shown using a shaded background. Observe that "r" never changes while "s" is changing, and vice-versa.

Nothing prevents all values from being read from A[ ] in parallel or written to B[ ] in parallel, because neither set of values participates in the loop-carried dependency chain. However, for the calculation of r and s, elements can be processed in parallel only while the value of the conditional expression remains the same (i.e., runs of true or false). This pattern for the execution of the program code for this loop is shown in of FIG. 4B. Note that the example uses vectors having eight elements in length. When processing the first vector instruction, the first iteration is performed alone (i.e., vector execution unit 204 processes only the first vector element), whereas iterations 1-5 are processed in parallel by vector execution unit 204, and then iterations 6-7 are processed in parallel by vector execution unit 204.

Referring to FIG. 5A and FIG. 5B, diagrams illustrating one embodiment of the vectorization of program code are shown. FIG. 5A depicts the original source code, while FIG. 5B illustrates the vectorized code representing the operations that may be performed using the Macroscalar architecture. In the vectorized code of FIG. 5B, Loop 1 is the loop from the source code, while Loop 2 is the vector-partitioning loop that processes the sub-vector partitions.

In the example, array A[ ] is read and compared in full-length vectors (i.e., for a vector of N elements, N positions of array A[ ] are read at once). Vector i2 is the DIV that controls partitioning of the vector. Partitioning is determined by monitoring the predicate p1 for transitions between false and true, which indicate loop-carried dependencies that should be observed. Predicate vector p2 determines which elements are to be acted upon at any time. In this particular loop, p1 has the same value in all elements of any sub-vector partition; therefore, only the first element of the partition needs to be checked to determine which variable to update.

After variable "s" is updated, the PropagatePostT instruction propagates the final value in the active partition to subsequent elements in the vector. At the top of the loop, the PropagatePriorF instruction copies the last value of "s" from the final vector position across all elements of the vector in preparation for the next pass. Note that variable "r" is propagated using a different method, illustrating the efficiencies of using the PropagatePriorF instruction in certain cases.

Software Speculation

In the previous example, the vector partitions prior to the beginning of the vector-partitioning loop could be determined because the control-flow decision was independent of the loop-carried dependencies. However, this is not always the case. Consider the following two loops shown in Example 2A and Example 2B:

EXAMPLE 2A

Program Code Loop 1

```
j = 0;
for (x=0; x<KSIZE; ++x)
{
if (A[x] < FACTOR)
{
j = A[x+j];
}
B[x] = j;
}
```

EXAMPLE 2B

Program Code Loop 2

```
j = 0;
for (x=0; x<KSIZE; ++x)
{
if (A[x+j] < FACTOR)
{
j = A[x];
}
B[x] = j;
}
```

In Example 2A, the control-flow decision is independent of the loop-carried dependency chain, while in Example 2B the control flow decision is part of the loop-carried dependency chain. In some embodiments, the loop in Example 2B may cause speculation that the value of "j" will remain unchanged and compensate later if this prediction proves incorrect. In such embodiments, the speculation on the value of "j" does not significantly change the vectorization of the loop.

In some embodiments, the compiler may be configured to always predict no data dependencies between the iterations of the loop. In such embodiments, in the case that runtime data dependencies exist, the group of active elements processed in parallel may be reduced to represent the group of elements that may safely be processed in parallel at that time. In these embodiments, there is little penalty for mispredicting more parallelism than actually exists because no parallelism is actually lost (i.e., if necessary, the iterations can be processed one element at a time, in a non-parallel way). In these embodiments, the actual amount of parallelism is simply recognized at a later stage.

dest=VectorReadIntFF(Base, Offset, pf)

VectorReadIntFF is a first-faulting variant of VectorReadInt. This instruction does not generate a fault if at least the first active element is a valid address. Results corresponding to invalid addresses are forced to zero, and flags pf are returned that can be used to mask predicates to later instructions that use this data. If the first active element of the address is unmapped, this instruction faults to allow a virtual memory system in computer system 100 (not shown) to populate a corresponding page, thereby ensuring that processor 102 can continue to make forward progress.

dest=Remaining(Pred)

The Remaining instruction evaluates a vector of predicates, Pred, and calculates the remaining elements in the vector. This corresponds to the set of inactive predicates following the last active predicate. If there are no active elements in Pred, a vector of all active predicates is returned. Likewise, if Pred is a vector of all active predicates, a vector of inactive predicates is returned. For example:

```
Entry
      pred = { 0 0 1 0 1 0 0 0 }
:
Exit: dest = { 0 0 0 0 0 1 1 1 }
```

FIG. 6A and FIG. 6B are diagrams illustrating embodiments of example vectorized program code. More particularly, the code sample shown in FIG. 6A is a vectorized version of the code in Example 2A (as presented above). The code sample shown in FIG. 6B is a vectorized version of the code in Example 2B. Referring to FIG. 6B, the read of A[ ] and subsequent comparison have been moved inside the vector-partitioning loop. Thus, these operations presume (speculate) that the value of "j" does not change. Only after using "j" is it possible to determine where "j" may change value. After "j" is updated, the remaining vector elements are re-computed as necessary to iterate through the entire vector. The use of the Remaining instruction in the speculative code sample allows the program to determine which elements remain to be processed in the vector-partitioning loop before the program can determine the sub-group of these elements that are actually safe to process (i.e., that don't have unresolved data dependencies).

In various embodiments fault-tolerant read support is provided. Thus, in such embodiments, processor 102 may speculatively read data from memory using addresses from invalid elements of a vector instruction (e.g., VectorReadFF) in an attempt to load values that are to be later used in calculations. However, upon discovering that an invalid read has occurred, these values are ultimately discarded and, therefore, not germane to correct program behavior. Because such reads may reference non-existent or protected memory, these embodiments may be configured to continue normal execution in the presence of invalid but irrelevant data mistakenly read from memory. (Note that in embodiments that support virtual memory, this may have the additional benefit of not paging until the need to do so is certain.)

In the program loops shown in FIG. 6A and FIG. 6B, there exists a loop-carried dependency between iterations where the condition is true, and subsequent iterations, regardless of the predicate value for the later iterations. This is reflected in the parameters of the ConditionalStop instruction.

The sample program code in FIG. 6A and FIG. 6B highlights the differences between non-speculative and speculative vector partitioning. More particularly, in Example 2A memory is read and the predicate is calculated prior to the ConditionalStop. The partitioning loop begins after the ConditionalStop instruction. However, in Example 2B, the ConditionalStop instruction is executed inside the partitioning loop, and serves to recognize the dependencies that render earlier operations invalid. In both cases, the GeneratePredicates instruction calculates the predicates that control which elements are used for the remainder of the partitioning loop.

Memory-based Loop-carried Dependencies

In the previous examples, the compiler was able to establish that no address aliasing existed at the time of compilation. However, such determinations are often difficult or impossible to make. The code segment shown in Example 3 below illustrates how loop-carried dependencies occurring through memory (which may include aliasing) are dealt with in various embodiments of the Macroscalar architecture.

EXAMPLE 3

Program Code Loop 3

```
for (x=0; x<KSIZE; ++x)
{
r = C[x];
s = D[x];
A[x] = A[r] + A[s];
}
```

In the code segment of EXAMPLE 3, the compiler cannot determine whether A[x] aliases with A[r] or A[s]. However, with the Macroscalar architecture, the compiler simply inserts instructions that cause the hardware to check for memory hazards at runtime and partitions the vector accordingly at runtime to ensure correct program behavior. One such instruction that checks for memory hazards is the CheckHazardP instruction which is described below.

dest=CheckHazardP (first, second, pred)

The CheckHazardP instruction examines two vectors of a memory address (or indicies) corresponding to two memory operations for potential data dependencies through memory. The vector 'first' holds addresses for the first memory operation, and vector 'second' holds the addresses for the second operation. The predicate 'pred' indicates or controls which elements of 'second' are to be operated upon. As scalar loop iterations proceed forward in time, vector elements representing sequential iterations appear left to right within vectors. The CheckHazardP instruction may evaluate in this context. The instruction may calculate a DIV representing memory hazards between the corresponding pair of first and second memory operations. The instruction may correctly evaluates write-after-read, read-after-write, and write-after-write memory hazards.

As with the ConditionalStop instruction described above, the element position corresponding to the iteration that generates the data that is depended upon may be stored in the destination vector at the element position corresponding to the iteration that is dependent upon the data. If no data dependency exists, a zero may be stored in the destination vector at the element position corresponding to the iteration that does not have the dependency. For example:

```
Entry:  first  = { 2 3 4 5 6 7 8 9 }
        second = { 8 7 6 5 4 3 2 1 }
        pred   = { 1 1 1 1 1 1 1 1 }
Exit:   dest   = { 0 0 0 0 3 2 1 0 }
```

As shown above, element 5 of the first vector ("first") and element 3 of the second vector ("second") both access array index 6 . Therefore, a 3 stored in position 5 of DIV. Likewise, element 6 of first and element 2 of second both access array index position 7, causing a 2 to be stored in position 6 of DIV, and so forth. A zero is stored in the DIV where no data dependencies exist.

In some embodiments, the CheckHazardP instruction may account for various sizes of data types. However, for clarity we describe the function of the instruction using only array index types.

The memory access in the example above has three memory hazards. However, in the described embodiments, only two partitions may be needed to safely process the associated memory operations. More particularly, handling the first hazard on element position 3 renders subsequent dependencies on lower or equally numbered element positions moot. For example:

```
Entry Conditions:                //DIV = { 0 0 0 0 3 2 1 0 }
                                 // p2  = { 0 0 0 0 0 0 0 0 }
p2 = GeneratePredicates(p2,DIV); // p2  = { 1 1 1 1 0 0 0 0 }
P2 = GeneratePredicates(p2,DIV)  // p2  = { 0 0 0 0 1 1 1 1 }
```

The process used by the described embodiments to analyze a DIV to determine where a vector should be broken is shown in pseudocode below. In some embodiments, the vector execution unit 204 of processor 102 may perform this calculation in parallel. For example:

```
List = <empty>;
for (x=STARTPOS; x<VECLEN; ++x)
{
    If(DIV[x] in List)
        Break from loop;
    Else if(DIV[x]>0)
        Append <x> to List;
}
```

The vector may safely be processed in parallel over the interval [STARTPOS,x), where x is the position where DIV[x]>0. That is, from STARTPOS up to (but not including) position x, where STARTPOS refers to the first vector element after the set of elements previously processed. If the set of previously processed elements is empty, then STARTPOS begins at the first element.

In some embodiments, multiple DIVs may be generated in code using ConditionalStop and/or CheckHazardP instructions. The GeneratePredicates instruction, however, uses a single DIV to partition the vector. There are two methods for dealing with this situation: (1) partitioning loops can be nested; or (2) the DIVs can be combined and used in a single partitioning loop. Either approach yields correct results, but the optimal approach depends on the characteristics of the loop in question. More specifically, where multiple DIVS are expected not to have dependencies, such as when the compiler simply cannot determine aliasing on input parameters, these embodiments can combine multiple DIVs into one, thus reducing the partitioning overhead. On the other hand, in cases with an expectation of many realized memory hazards, these embodiments can nest partitioning loops, thereby extracting the maximum parallelism possible (assuming the prospect of additional parallelism exists).

In some embodiments, DIVs may be combined using a VectorMax(A,B) instruction as shown below.

```
i2  = CheckHazardP(a,c,p0);  //i2 = {0 0 2 0 2 4 0 0}
i3  = CheckHazardP(b,c,p0);  //i3 = {0 0 1 3 3 0 0 0}
ix  = VactorMax(i2,i3);      //ix = {0 0 2 3 3 4 0 0}
```

Because the elements of a DIV should only contain numbers less than the position of that element, which represent dependencies earlier in time, later dependencies only serve to further constrain the partitioning, which renders lower values redundant from the perspective of the GeneratePredicates instruction. Thus, taking the maximum of all DIVs effectively causes the GeneratePredicates instruction to return the intersection of the sets of elements that can safely be processed in parallel.

FIG. 7 is a diagram illustrating one embodiment of example vectorized program code. More particularly, the code sample shown in FIG. 7 is a vectorized version of the code in Example 3 (as presented above). Referring to FIG. 7, no aliasing exists between C[ ] or D[ ] and A[ ], but operations on A[ ] may alias one another. If the compiler is unable to rule out aliasing with C[ ] or D[ ], the compiler can generate additional hazard checks. Because there is no danger of aliasing in this case, the read operations on arrays C[ ] and D[ ] have been positioned outside the vector-partitioning loop, while operations on A[ ] remain within the partitioning loop. If no aliasing actually exists with A[ ], the partitions retain full vector size, and the partitioning loop simply falls through without iterating. However, for iterations where aliasing does occur, the partitioning loop partitions the vector to respect the data dependencies thereby ensuring correct operation.

In the embodiment shown in the code segment of FIG. 7, the hazard check is performed across the entire vector of addresses. In the general case, however, it is often necessary to check hazards between conditionally executed memory operations. The CheckHazardP instruction takes a predicate that indicates which elements of the second memory operation are active. If not all elements of the first operation are active, the CheckHazardP instruction itself can be predicated with a zeroing predicate corresponding to those elements of the first operand which are active. (Note that this may yield correct results for the cases where the first memory operation is predicated.)

The code segment in Example 4 below illustrates a loop with a memory hazard on array E[ ]. The code segment conditionally reads and writes to unpredictable locations within the array. In FIG. 8 a diagram illustrating one embodiment of example vectorized program code is shown. More particularly, the code sample shown in FIG. 8 is a vectorized Macroscalar version of the code in Example 4 (as presented above).

EXAMPLE 4

Program Code Loop 4

```
j = 0;
for (x=0; x<KSIZE; ++x)
{
    f = A[x];
    g = B[x];
    if (f < FACTOR)
    {
        h = C[x];
        j = E[h];
    }
    if (g < FACTOR)
    {
        i = D[x];
        E[i] = j;
    }
}
```

Referring to FIG. 8, the vectorized loop includes predicates p1 and p2 which indicate whether array E[ ] is to be read or written, respectively. The CheckHazardP instruction checks vectors of addresses (h and i) for memory hazards. The parameter p2 is passed to CheckHazardP as the predicate controlling the second memory operation (the write). Thus, CheckHazardP identifies the memory hazard(s) between unconditional reads and conditional writes predicated on p2. The result of CheckHazardP is zero-predicated in p1. This places zeroes in the DIV(ix) for element positions that are not to be read from E[ ]. Recall that a zero indicates no hazard. Thus, the result, stored in ix, is a DIV that represents the hazards between conditional reads predicated on p1 and conditional writes predicated on p2. This is made possible because non-hazard conditions are represented with a zero in the DIV.

It is noted that in the above embodiments, to check for memory-based hazards, the CheckHazardP instruction was used. As described above, the CheckHazardP instruction takes a predicate as a parameter that controls which elements of the second vector are operated upon. However, in other embodiments other types of CheckHazard instructions may be used. For example, as used in various examples below a CheckHazard instruction that omits the predicate parameter may be used, dependent upon the specific desired code implementation. In one embodiment, this version of the CheckHazard instruction may simply operate unconditionally on the two input vectors. Regardless of which version of the CheckHazard instruction is employed, it is noted that as with any Macroscalar instruction that supports result predication and/or zeroing, whether or not the a given element of a result vector is modified by execution of the CheckHazard instruction may be separately controlled through the use of a predicate vector or zeroing vector, as described above. That is, the predicate parameter of the CheckHazardP instruction controls a different aspect of instruction execution than the general predicate/zeroing vector described above.

Detection of a First Backward Branch after a Predicate Generating Instruction

As described above, when vectorizing a code segment, a vector-partitioning loop may be used in the program code that performs the vectorization to correctly handle possible loop-carried dependencies, such as memory hazards, for example. In such program code, a Macroscalar instruction such as the CheckHazard instruction (described above), for example, may generate a DIV that may later be used by the Macroscalar GeneratePredicates instruction that is part of the vector-partitioning loop. In addition, the vector-partitioning loop uses a backward branch as part of the loop. As mentioned above, if this backward branch is predicted accurately, processor performance may be maintained. However, if this branch is predicted poorly (which in many cases it is), performance may suffer. Thus, it may be beneficial in certain cases to suppress prediction of the branch and wait for the DIV to become available. That is, in some instances, the penalty of effectively stalling execution until the DIV is available may be less than the penalty of mispredicting the branch that forms the boundary of a vector-partitioning loop.

As a particular example of a vector-partitioning loop that might benefit from the techniques described here, an example of a code segment that generates a histogram A[ ] representing items in B[ ] is shown in Example 5 below.

EXAMPLE 5

```
for (x=0; x<K; ++x)
    A[B[x]] = A[B[x]] + 1;
```

When a compiler vectorizes the code segment of Example 5, it must recognize whether any elements in a vector of B[ ] contain the same value. If this is not done, the code will not recognize which elements of A[ ] will be modified, affecting later modifications of A[ ] in the same vector. A Macroscalar code segment that includes a vector-partitioning loop that handles any loop-carried dependencies in the code segment of Example 5 is shown in Example 6.

EXAMPLE 6

```
p1 = FALSE;
V0 = VectorRead(B,x);
V2 = CheckHazard(V0,V0); // calculate DIV
PartLoop:
    p1 = GeneratePredicates(p1, V2);
    p1: V1 = VectorRead(A,V0);
    p1: V1 = VectorIncr(V1);
    p1: VectorWrite(A,V1);
    Branch on Carry-Clear to PartLoop
```

In the code segment of Example 6, the CheckHazard instruction evaluates memory addresses to detect memory hazards (producing the DIV stored in V2), and the GeneratePredicates instruction uses this information to calculate a predicate that controls the number of elements that may safely be processed in parallel. If the entire vector cannot safely be processed in parallel, the vector-partitioning loop (Part Loop) iterates until a full vector has been processed (which is designated by one of the processor flags such as the Carry-flag being set).

Even when there are actually no memory hazards in a loop, it is often the case that a compiler cannot determine this conclusively at compile time. Thus, the entire vector is often processed in parallel at run time, even though the compiler was forced to emit a vector-partitioning loop. Conventional branch predictors may operate efficiently in this case, predicting that the loop will never iterate, and full performance is maintained.

However, in the case where the vector is frequently partitioned, conventional branch predictors often predict poorly, affecting performance adversely. This may be harmful because of the nature of vector-partitioning loops. A vector-partitioning loop will typically contain a chain of instructions that are serially dependent upon one another. Performance of this section of code may therefore be constrained by the serial code even if branch prediction were perfect. As described above, there is a performance penalty for predicting branches poorly, and the upside for predicting well is limited, due to the nature of the loop. Furthermore, in cases where the partitioning loop actually iterates more than once, it will only iterate a limited number of times (usually just a few iterations). This may lead to high mispredict rates in these cases, which adversely affects both power and performance. Thus, branch prediction accuracy of the vector-partitioning loop may be critically important. Accordingly, as described further below, upon detecting a first backward flow control instruction that follows a predicate generating instruction, the prediction of that flow control instruction may be suppressed until the DIV becomes available, dependent upon a received indication of the prediction accuracy.

Figure 9:
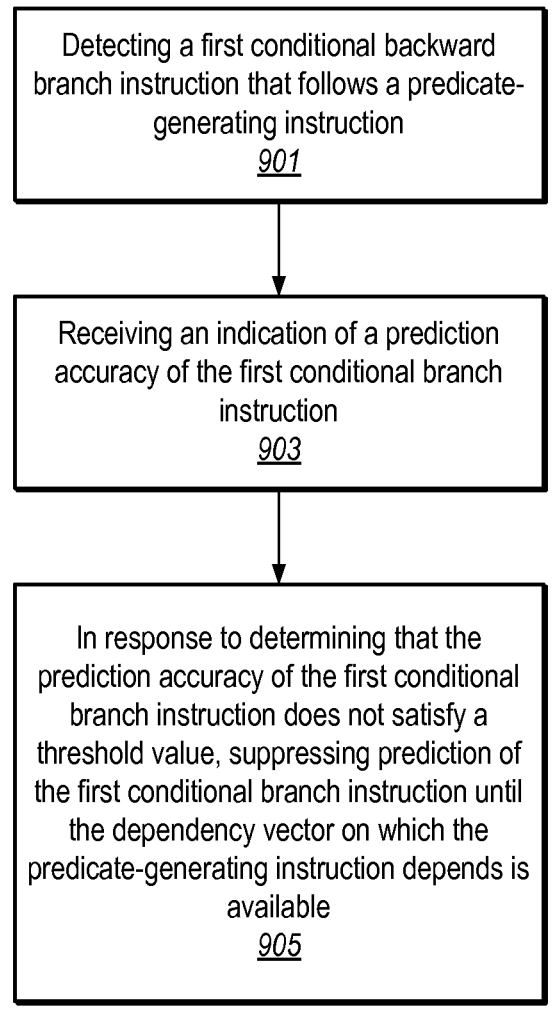
FIG. 9 is a flow diagram depicting the operation of one embodiment of the processor of FIG. 2 during execution of program instructions that form a vector-partitioning loop.

In FIG. 9, a flow diagram depicting the operation of one embodiment of the processor of FIG. 2 during execution of program instructions that form a vector-partitioning loop is shown. Referring collectively to FIG. 2 through FIG. 9 and beginning in block 901 of FIG. 9, the branch prediction unit 210 detects a first conditional backward branch instruction that follows a predicate generating instruction. More particularly, in one embodiment, the conditional backward branch instruction may be a conditional branch instruction that branches to a target address that precedes the branch instruction (e.g., to the start of the vector-partitioning loop), and which branches when a conditional statement evaluates true. In the embodiment shown in Example 6, the conditional statement is dependent on the carry-clear condition-code. In addition, the predicate generating instruction may be a Macroscalar GeneratePredicates instruction which, as described above, may create a predicate vector that is dependent upon a dependency vector such as the DIV. In one implementation, the backward branch instruction that is detected after the GeneratePredicates instruction may be a branch instruction that is based upon a condition-code that is set by the Macroscalar CheckHazard instruction or the Macroscalar ConditionalStop instruction, which are both described above in detail. It is noted that although the Macroscalar CheckHazard instruction is used in conjunction with Example 6, it is contemplated that other versions of the Macroscalar CheckHazard instruction, such as the predicated CheckHazardP instruction, for example, may be used instead.

As described above, the branch prediction unit 210 may generate and maintain prediction accuracy information for various branch predictions. Thus, the branch prediction unit 210 may be configured to generate and/or receive an indication of the prediction accuracy of the backward branch instruction (block 903). In one implementation, the accuracy indication may be an accuracy value that indicates the accuracy, while in other implementations the accuracy indication may be a binary signal that is indicative of whether or not the prediction accuracy satisfies a predetermined accuracy threshold.

In various embodiments, the threshold that determines whether a given branch is or is not accurately predicted for the purposes of suppressing prediction may be an implicit or hard-coded value, a value that may be modified through firmware or test-mode operation of the process, or a value that may be freely modified by software. The threshold may variously be fixed or allowed to dynamically vary as a result of run-time behavior. In some embodiments, different threshold values may be separately maintained for different instances of branches, for example, as part of the statistics associated with a given branch in a branch history table maintained by branch prediction unit 210. Alternatively, instead of explicitly storing a threshold for different branches, branch prediction unit 210 may simply store a binary indication of whether a given branch is or is not accurately predicted, as mentioned above.

In one embodiment, in response to determining that the prediction accuracy of the backward branch instruction does not satisfy the predetermined threshold, the branch prediction unit 210 may be configured to suppress the prediction until the DIV is available (block 905). More particularly, since the DIV information indicates the exact number of times the loop will iterate, in one embodiment the branch prediction unit 210 may be configured to use the DIV information to predict any future branches. For example, the DIV may indicate that a vector may require three passes through the loop. Using this information, the branch prediction unit 210 may avoid mispredicting the backward branch, because the number of loop iterations may be known from the DIV with certainty.

In one implementation, the branch prediction unit 210 may stall the pipeline while waiting for the DIV, thereby preventing any additional instructions from being fetched. In another implementation, the branch prediction unit 210 may cause the processor 102 to switch contexts while waiting for the DIV to be available. In another embodiment, when the DIV information is available, the branch prediction unit 210 may send a loop fetch notification to the fetch unit 201. In response to the indication, the fetch unit 201 may use the DIV information to load the instructions for each iteration of the vector-partitioning loop.

It is noted that waiting for the DIV to become available may be substantially equivalent to waiting for the condition-code that controls the branch to become available, since they are both generated by the same instruction. This allows the fetch unit 201 of the processor 102 to resume fetching immediately based on the condition-code, even though it may take several cycles to analyze the DIV and to configure the branch prediction unit 210 accordingly. This may minimize the pipeline stall in the case when the pipeline is stalled to wait for the DIV. It is also noted that in one embodiment, the accuracy of the branch prediction may continue to be tracked for this branch, even though the branch was suppressed and the DIV information was used. This may allow the branch prediction unit 210 to detect when the accuracy of the prediction satisfies the threshold, and to change its operating mode to predict the branch rather than wait for the DIV to become available. That is, the decision to suppress prediction of a given branch based on poor accuracy may be reversible at a later time if accuracy should improve.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method, comprising:
    detecting a first conditional branch instruction that follows a predicate-generating instruction, wherein the first conditional branch instruction branches backwards when taken, wherein the predicate-generating instruction, when executed, generates a predicate vector dependent upon a dependency vector, wherein each element of the dependency vector includes an index that indicates whether a data dependency exists between elements of a vector instruction, wherein the first conditional branch instruction forms part of a vector partitioning loop that executes the vector instruction one or more times, wherein a number of iterations of the vector partitioning loop depends upon the dependency vector, and wherein the predicate vector indicates which elements of the vector instruction are to be processed during execution of the vector instruction;
    receiving an indication of a prediction accuracy of the first conditional branch instruction; and
    in response to determining, based upon the indication of the prediction accuracy, that the prediction accuracy of the first conditional branch instruction does not satisfy a threshold value, suppressing prediction of the first conditional branch instruction until the dependency vector on which the predicate-generating instruction depends is available.

2. The method of claim 1, further comprising in response to detecting that the dependency vector is available, predicting the first conditional branch instruction using data dependency information indicated in the dependency vector.

3. The method of claim 2, wherein predicting the first conditional branch instruction comprises determining, from the dependency vector, an exact number of times the conditional branch instruction will be taken.

4. The method of claim 1, wherein the predicate generating instruction is a Macroscalar GeneratePredicates instruction.

5. The method of claim 1, wherein suppressing prediction of the first conditional branch instruction includes predicting the first conditional branch instruction and discarding the prediction.

6. The method of claim 1, wherein suppressing prediction of the first conditional branch instruction includes preventing new instructions from being executed until the dependency vector is available.

7. A processor comprising:
a fetch unit configured to selectively fetch instructions for execution; and
a prediction unit coupled to the fetch unit and configured to detect a first conditional branch instruction that follows a predicate-generating instruction, wherein the first conditional branch instruction branches backwards when taken, wherein the predicate-generating instruction, when executed, generates a predicate vector dependent upon a dependency vector, wherein each element of the dependency vector includes an index that indicates whether a data dependency exists between elements of a vector instruction, wherein the first conditional branch instruction forms part of a vector partitioning loop that executes the vector instruction one or more times, wherein a number of iterations of the vector partitioning loop depends upon the dependency vector, and wherein the predicate vector indicates which elements of the vector instruction are to be processed during execution of the vector instruction;
wherein the prediction unit is configured to generate an indication of a prediction accuracy of the first conditional branch instruction; and
wherein the prediction unit is configured to, in response to determining that the prediction accuracy of the first conditional branch instruction does not satisfy a threshold value, suppress prediction of the first conditional branch instruction until the dependency vector on which the predicate-generating instruction depends is available.

8. The processor as recited in claim 7, wherein the prediction unit is configured to predict the first conditional branch instruction in response to receiving data dependency information indicated in the dependency vector.

9. The processor as recited in claim 7, wherein the fetch unit is configured to stall while waiting for the dependency vector to be available.

10. The processor as recited in claim 7, further comprising an execution unit coupled to the fetch unit and configured to switch contexts while waiting for the dependency vector to be available.

11. The processor as recited in claim 7, wherein the prediction unit is configured to generate a prediction for the first conditional branch, and wherein to suppress prediction of the first conditional branch, the prediction unit is configured to discard the prediction of the first conditional branch instruction in response to determining that the prediction accuracy of the first conditional branch instruction does not satisfy the threshold value.

12. A method comprising:
initiating generation of a dependency vector, wherein each element of the dependency vector includes an index that indicates whether a data dependency exists between elements of a vector instruction;
detecting that a branch instruction will be executed subsequent to execution of a predicate generating instruction that uses the dependency vector to generate a predicate vector, wherein the branch instruction alters the flow of control of program instruction execution dependent upon a conditional value by branching to a target that is backward in the flow of control of program instruction execution;
generating a prediction that the flow of control of program instruction execution is not altered by execution of the branch instruction;
receiving an accuracy value that indicates an accuracy of the prediction; and
before generation of the dependency vector is complete, and in response to determining that the accuracy value does not satisfy a threshold value, discarding the prediction, and using the dependency vector when it becomes available to determine a number of times that the flow of control of program instruction execution is altered responsive to each execution of the branch instructions;
wherein the branch instruction forms part of a vector partitioning loop that executes the vector instruction one or more times, wherein a number of iterations of the vector partitioning loop depends upon the dependency vector, and wherein the predicate vector indicates which elements of the vector instruction are to be processed during execution of the vector instruction.

13. The method as recited in claim 12, further comprising detecting that the dependency vector is available, and predicting the branch instruction using data dependency information indicated in the dependency vector.

14. The method as recited in claim 12, further comprising determining, from the dependency vector, an exact number of times the branch instruction will be taken.

15. The method as recited in claim 12, wherein discarding the prediction and using the dependency vector when it becomes available includes preventing new instructions from being fetched into an execution pipeline until the dependency vector becomes available.

16. The method as recited in claim 12, wherein discarding the prediction and using the dependency vector when it becomes available includes preventing new instructions from being executed until the dependency vector is available.

17. A processor comprising:
a prediction unit configured to detect a first conditional branch instruction that follows a predicate-generating instruction, wherein the first conditional branch instruction branches backwards when taken;
an execution unit configured to execute the predicate-generating instruction to generate a predicate vector that is dependent upon a dependency vector, wherein each element of the dependency vector includes an index that indicates whether a data dependency exists between elements of a vector instruction; and
a fetch unit coupled to the prediction unit and configured to selectively fetch instructions based upon a prediction of the first conditional branch instruction;
wherein the prediction unit is configured to generate an indication of a prediction accuracy of the first conditional branch instruction;
wherein the prediction unit is configured to, in response to determining that the prediction accuracy of the first conditional branch instruction does not satisfy a threshold value, suppress a prediction of the first conditional branch instruction and to stall the fetch unit until the dependency vector on which the predicate-generating instruction depends is available; and
wherein the first conditional branch instruction forms part of a vector partitioning loop that executes the vector instruction one or more times, wherein a number of iterations of the vector partitioning loop depends upon the dependency vector, and wherein the predicate vector indicates which elements of the vector instruction are to be processed during execution of the vector instruction.

18. The processor as recited in claim 17, wherein the first conditional branch instruction defines a boundary of an instruction loop, and wherein the dependency vector indicates an exact number of times the instruction loop will be executed.

19. The processor as recited in claim 18, wherein in response to detecting that the dependency vector is available, the prediction unit is configured to provide a loop fetch indication, and wherein the fetch unit is configured to fetch instructions for each iteration of the instruction loop in response to receiving the loop fetch indication.

20. The processor as recited in claim 18, wherein the prediction unit is further configured to prevent execution of new instructions until the dependency vector is available.

21. A system comprising:
a memory configured to store program instructions; and
a processor coupled to the memory, wherein the processor includes:
an execution unit including a plurality of execution pipelines and configured to concurrently operate on different elements of a vector operand of a vector program instruction; and
a prediction unit coupled to the execution unit and configured to detect a first conditional branch instruction that follows a predicate-generating instruction, wherein the first conditional branch instruction branches backwards when taken, and wherein the predicate-generating instruction, when executed, generates a predicate vector dependent upon a dependency vector, wherein each element of the dependency vector includes an index that indicates whether a data dependency exists between elements of a vector instruction;
wherein the execution unit is configured to receive an indication of a prediction accuracy of the first conditional branch instruction;
wherein the execution unit is configured to, in response to determining that the prediction accuracy of the first conditional branch instruction does not satisfy a threshold value, suppress a prediction of the first conditional branch instruction until the dependency vector on which the predicate-generating instruction depends is available; and
wherein the first conditional branch instruction forms part of a vector partitioning loop that executes the vector instruction one or more times, wherein a number of iterations of the vector partitioning loop depends upon the dependency vector, and wherein the predicate vector indicates which elements of the vector instruction are to be processed during execution of the vector instruction.

* * * * *